United States Patent Office 3,293,130
Patented Dec. 20, 1966

3,293,130
PANLEUKOPENIA VACCINE AND METHOD FOR THE PRODUCTION THEREOF
Eben A. Slater and Carrell J. Kucera, St. Joseph, Mo., assignors to Philips Roxane, Inc., St. Joseph, Mo., a corporation of Delaware
No Drawing. Filed Nov. 27, 1962, Ser. No. 240,408
18 Claims. (Cl. 167—78)

This invention relates to a novel vaccine for panleukopenia and also relates to a novel method of preparing the same.

Numerous investigators have attempted to propagate panleukopenia virus in tissue culture without success. The standard procedure employed by all prior workers involved utilizing the kidney of a cat which was free of panleukopenia virus in a tissue culture and then inoculating the tissue culture with the virulent virus. For reasons which are not clear, the virus fails to grow in a tissue culture when the seed virus is used with a fresh tissue culture.

In view of the commercial importance of developing a vaccine for panleukopenia, numerous experiments were conducted in an effort to find a satisfactory procedure for the making of vaccine. The investigation of this problem has revealed that the cat contains numerous types of viruses which can be easily confused with panleukopenia. Samples of seed virus of panleukopenia have been found to be contaminated with other viruses that would propagate in tissue culture, giving the erroneous impression that the panleukopenia virus was actually being cultured. It was only after very extensive work that, quite unexpectedly, a method of propagating panleukopenia in tissue culture was discovered which yielded a vaccine that could successfully immunize cats against the disease.

Accordingly, an object of this invention is to provide a vaccine for panleukopenia.

Another object of this invention is to provide a method of propagating panleukopenia virus in tissue culture.

Other objects and advantages of this invention will become apparent from the following description and explanation thereof.

In accordance with the present invention a healthy member of the family Felidae such as a cat, which is suceptible to panleukopenia is infected with the panleukopenia virus. The virus is given an opportiunity to grow and after the animal shows pathological symptoms of the disease, it is sacrificed for the recovery of the virus. It is this stage of the procedure that marks the novelty of the present invention when compared with prior art techniques. Tissue from the sacrificed animal infected with panleukopenia virus, preferably the kidneys, is removed, and after preparatory treatment, is placed in a tissue culture. It is important to the success of our invention that the tissue containing the virus become part of the tissue culture.

Microscopic examination of the tissue culture containing the kidney tissue and virus will reveal that the kidney cells will generate into monolayers of cells within a reasonable amount of time. At the end of about 2 to 10 days after the tissue culture is prepared, the liquid of the tissue culture is harvested and used for subsequent passages in panleukopenia virus-free cat kidney tissue cultures. For the purpose of all subsequent passages of the harvested virus, the fresh kidney tissue can be obtained from disease free cats as previously indicated. For some unexplainable reason, the growth of the panleukopenia virus must first take place within a tissue culture, such as a culture of the kidneys, of the infected animal, and then it can be passed in other tissue cultures. A vaccine can be prepared from the virus by passing it at least about six times in tissue culture, or preferably at least ten times in tissue culture of cat kidney, and the total number of passages can be up to a number of passages where the virus becomes non-antigentic, as determined by challenge of an animal vaccinated therewith, with virulent panleukopenia virus. Generally no greater than 250 passages are employed and for economic reasons no greater than 50. About 10–30 passages are preferred and about 20–30 especially preferred. At about the fifth passage in tissue culture of cat kidney, it will be noted that the test animal will survive a challenge of the panleukopenia virus but will experience a rather serious reaction prior to the challenge. As a result, it is desirable to attenuate the virus still further before using it as a vaccine for the immunization of cats.

The vaccine prepared in accordance with the present invention is useful for the immunization of any member of the Felidae family. Accordingly, the domestic cat, the ocelot, tiger, leopard, panther, jaguar, etc., can be protected by means of the vaccine of this invention.

In the preparation of the attenuated virus, the tissue, generally kidney, containing the panleukopenia virus is removed from the cat under aseptic conditions. (In the case of kidney tissue, the capsule surrounding each kidney is removed and the cortical tissues are secured.) The infected tissues are minced and then trypsinized by the procedure described in J.S. Youngher, Proc. Soc. Exptl. Biol. and Med.: 85, 202 (1954). The cell suspension is then centrifuged and the supernatant liquid is discarded. The cells are re-suspended in an animal serum such as, for example, calf serum, to inactivate the residual trypsin and then recentrifuged. The serum is discarded and the packed cells are suspended in a growth medium. The growth medium in which the cells can be cultured include Parker's 199, Karzon's, Earle's, etc., either with or without the additional use of an antibiotic such as penicillin, streptomycin, etc. About one part of the infected cells are added to about 200 to 400 parts of growth medium. An animal serum is also employed with the growth medium. Exemplary of animals from which this serum may be derived are a calf, horse, lamb, hog, goat, and the like. About 7 to 15%, preferably about 10%, of the growth medium comprises the animal serum. The cells and virus are incubated at a temperature of about 30° to 37° C., specifically about 36° C. The culture medium may be replaced at the end of about 24 to 60 hours from the time that the packed cells are combined with it to promote faster growth of the cells and the virus. Before the addition of the new growth medium, the pH may be adjusted to a range of about 6.5 to 7.8. Within about 1.5 days thereafter, the growth medium is replaced again, and this time the quantity of animal serum is reduced such that the final concentration comprises about 3 to 7%. For the remainder of the first passage, the growth medium may be replaced every three to seven days, for a total period of about 15 to 25 days commencing from the time that the virus infected tissue was cultured.

After the liquid containing virus is harvested from the culture medium of the first passage, it is further passed in culture mediums containing cat tissue free of panleukopenia infection. As in the first passage, the virus is contained in the growth medium of the same composition as previously specified, except for the cat tissue being obtained from a cat free of panleukopenia disease, for a period of about 24 to 60 hours at the previously described incubation temperature. Thereafter, the growth medium is first replaced within 1.5 to 5 days, and then for the remainder of each passage the growth medium is replaced every 3 to 7 days for a total of 6 to 20 days for each passage. The length of the passage will be determined by the extent of degeneration suffered by the cells of the infected culture mediums, consequently the time for each passage may vary from what has been specified.

The vaccine of the present invention is also useful for the protection of mink against enteritis. For such a purpose, the attenuated panleukopenia virus can be serially passed in the manner described above.

However, in general the passages are for at least about 10 times, more usually at least about 15 times, and as high as 60 times or higher can be used. The vaccine can be injected or fed into the enteritis susceptible mink, or the young mink of about 4 to 8 weeks old in doses of about 10 to 1,000 $TCID_{50}$, usually about 100 to 300 $TCID_{50}$.

For the vaccination of cats against panleukopenia disease, the dose of vaccine may vary from about 10 to 1,000 $TCID_{50}$. (The actual limits being dictated by economic practicality coupled with effective immunization.) More usually the dose is about 100 to 300 $TCID_{50}$. The cats can be vaccinated at any time, namely while at least 6 to 8 weeks old to any later age while they are still susceptible to the disease.

To provide a fuller understanding of the present invention, reference will now be had to specific examples. Two domestic cats which were susceptible to the panleukopenia disease (as determined seriologically) were injected with the virus. After the cats exhibited severe clinical and pathological signs of the disease, they were sacrificed for the purpose of preparing tissue cultures. The cats involved were approximately four months of age. Daily temperatures and the total white blood cell counts, abbreviated as "w.b.c.," were taken and are reported in Table 1 below.

sule surrounding each kidney was removed, the cortical tissues were secured and minced, and then trypsinized by the procedure described by Younger supra. The cell suspension was centrifuged at 600 r.p.m. and the supernatant liquid was discarded. The cells were resuspended in 15 ml. of calf serum to destroy the effect of residual trypsin before being re-centrifuged as described above. The serum was discarded and the packed cells were suspended in a growth medium in a ratio of one part of packed cells to 250 parts of growth medium. The growth medium consisted of Earle's salt solution to which were added 0.5% lactalbumin hydrolysate and 10% calf serum.

The tissue culture suspension was placed into standard tissue culture tubes, also known as roller tubes, in amounts of 1 ml. The tubes were incubated in a stationary position at a temperature of 36.5° C., ±0.5° C. At the end of 48 hours most of the cells were stuck to the glass and showed signs of reproduction. The old growth medium was discarded and replaced with fresh growth medium of the same composition as the original one. Before the addition of the fresh growth medium the pH was adjusted to approximately 7.4. The tissue cultures were maintained in this state until the fifth day of postplanting. At this time the pH had decreased to about 6.8. The old media was again replaced with new growth media of the same composition as the original one except that in the new growth media the serum content was reduced from 10% to 5% calf serum. For the remainder of the passage, the growth medium was replaced with fresh medium at five-day intervals. In this part of the passage, the pH had dropped to about 6.8. The growth media changes continued for 18 to 20 days post-

TABLE 1

| | | | | | | | | |
|---|---|---|---|---|---|---|---|---|
| Cat A: | | | | | | | | |
| Days Post-Inoc | 2 | 3 | 4 | 5 | 6 | 7 | 8 | 9 |
| Temperature | 103.0 | 102.6 | 102.0 | 103.6 | 102.0 | 102.8 | 103.0 | 105.0 |
| W.b.c | 16,950 | 17,750 | 13,350 | 14,400 | 12,400 | 5,850 | 1,300 | 300 Posted |
| Cat B: | | | | | | | | |
| Days Post-Inoc | 2 | 3 | 4 | 5 | 6 | 7 | 8 | 9 |
| Temperature | 101.8 | 102.0 | 102.2 | 103.8 | 102.6 | 103.8 | 102.2 | |
| W.b.c | 11,950 | 9,350 | 7,400 | 13,850 | 2,500 | 1,700 | 550 | Posted |

Each cat was killed by an injection of sodium pentobarbital. Each cat was processed separately, though in similar manners, in order to determine whether the virus was of a peculiar nature or due to the particular cat involved, or whether the propagation was actually attributable to the technique of the present injection.

The kidneys of each cat were removed under aseptic conditions. An examination of the remaining organs of each cat revealed that the cats suffered from panleukopenia infection. The clinical symptoms and post-mortem findings corresponded to those described by Hammon and Enders in the J. Exptl. Med: 69, 327 (1939). The capplanting of the virus. The fluid phases of the cultures were removed and pooled. The pooled fluid was employed for the inoculation of susceptible cats to determine the effect of the virus, if any.

One ml. of the pooled fluid from each of the two tissue cultures derived from cats A and B was inoculated into susceptible cats at various passage levels to determine the effect, if any. In Table 2 below the letter A or B refers to the fact that the virus was obtained from cat A or B, and the number following the letter represents the number of the test animal into which the pooled fluid was injected.

TABLE 2

| | | | | | | | | |
|---|---|---|---|---|---|---|---|---|
| Cat A-1: | | | | | | | | |
| Days Post-Inoc | 2 | 3 | 4 | 5 | 6 | 7 | 8 | |
| Temperature | 102.2 | 101.6 | 102.6 | 102.2 | 105.2 | 105.4 | Dead | |
| W.b.c | 13,800 | 13,100 | 9,300 | 3,350 | 950 | 850 | | |
| Cat A-2: | | | | | | | | |
| Days Post-Inoc | 2 | 3 | 4 | 5 | 6 | 7 | 8 | |
| Temperature | 102.4 | 101.6 | 101.8 | 102.6 | 104.0 | 100.8 | 103.0 | |
| W.b.c | 13,450 | 13,300 | 6,650 | 16,650 | 900 | 450 | 1,000 Posted | |
| Cat B-1: | | | | | | | | |
| Days Post-Inoc | 2 | 3 | 4 | 5 | 6 | 7 | 8 | |
| Temperature | 102.4 | 102.2 | 101.8 | 102.0 | 103.4 | 103.4 | Posted | |
| W.b.c | 11,700 | 18,500 | 14,400 | 13,450 | 9,700 | 900 | | |
| Cat B-2: | | | | | | | | |
| Days Post-Inoc | 2 | 3 | 4 | 5 | 6 | 7 | 8 | |
| Temperature | 101.8 | 102.2 | 102.0 | 103.6 | 104.8 | 105.2 | Dead | |
| W.b.c | 17,750 | 16,950 | 13,850 | 9,350 | 2,500 | 350 | | |

The four cats described in Table 2 responded to the injection of pooled fluid with a marked fever and drastically reduced w.b.c. Two cats were found dead on the eighth day following inoculation of the virus, whereas the other two were killed in a moribund condition. The symptoms in the four cats were practically identical to those found in cats A and B, thus confirming that the cats had contracted panleukopenia.

The pooled fluid from the first tissue culture was used to inoculate a fresh tissue culture medium of the second passage, which was prepared by using the kidneys from a normal disease-free cat. The procedure followed in the preparation of the cat kidney of the disease-free cat was similar to that described in connection with the treatment of the kidneys of the virus-injected cats A and B. The fluid which had been harvested from the first tissue culture passage was added to the cell suspension prepared with the kidneys of the disease-free cat in a concentration of 1 ml. of harvested fluid for each 10 ml. of cell suspension. The cells were placed in tubes in amounts of 1 ml. and incubated at a temperature of 36.5° C., ±0.5° C. At the end of 48 hours the growth medium was replaced with fresh growth medium of the same composition as the original one. At the end of five days a full cell sheet appeard and the growth medium was again replaced with fresh medium except that the concentration of the calf serum was reduced to 5%. Thereafter the growth medium was replaced at four to five day intervals. At the end of fifteen days, the cells were in poor condition which necessitiated harvesting the fluid and pooling them for passage into fresh tissue culture in the next passage.

For the third passage level, the kidney of a disease-free cat was obtained by the procedure described above, in connection with the second passage, and also the cell suspension was prepared by that procedure. For this passage, instead of waiting fifteen days for the harvesting of the fluid, the fluid was harvested at the end of seven days. For all subsequent passages the same procedure was repeated until the virus had been serially passed for a total of sixteen times. At the end of several passages, disease-free domestic cats susceptible to panleukopenia were inoculated to determine what effect, if any, the attenuated virus would have on the cats. The results are recorded in Table 3 below:

TABLE 3

(Third Passage Virus)

| Cat A-3: | | | | | | | | |
|---|---|---|---|---|---|---|---|---|
| Days Post-Inoc | 2 | 3 | 4 | 5 | 6 | 7 | 8 | 9 |
| Temperature | 102.8 | 103.4 | 103.2 | 103.6 | 101.6 | 104.4 | 106.0 | 103.0 |
| W.b.c | 17,550 | 8,000 | 7,500 | 8,300 | 3,300 | 1,800 | 950 | 7,600 |
| Days Post-Inoc | 10 | 11 | | | | | | |
| Temperature | 101.2 | 101.2 | (1) | | | | | |
| W.b.c | 9,000 | 11,100 | | | | | | |
| Cat B-3: | | | | | | | | |
| Days Post-Inoc | 2 | 3 | 4 | 5 | 6 | 7 | 8 | |
| Temperature | 101.0 | 103.4 | 102.0 | 102.6 | 104.2 | 106.4 | 106.2 | |
| W.b.c | 18,050 | 6,100 | 5,250 | 9,000 | 2,150 | 2,200 | 4,450 | |
| Days Post-Inoc | 9 | 10 | 11 | | | | | |
| Temperature | 106.2 | 104.0 | 103.2 | Dead | | | | |
| W.b.c | 21,400 | 17,100 | 13,300 | | | | | |
| Cat B-4: | | | | | | | | |
| Days Post-Inoc | 2 | 3 | 4 | 5 | 6 | 7 | 8 | |
| Temperature | 100 | 102.0 | 101.8 | 101.6 | 101.6 | 101.6 | 102.0 | |
| W.b.c | 13,050 | 9,150 | 10,150 | 5,500 | 4,150 | 5,100 | 3,050 | |
| Days Post-Inoc | 9 | 10 | 11 | 12 | 13 | 14 | 15 | |
| Temperature | 103.0 | 102.4 | 102.4 | 103.2 | 100.6 | 101.4 | 100.4 | (2) |
| W.b.c | 5,250 | 8,950 | 15,550 | 32,000 | 25,100 | 20,150 | 15,950 | |
| Cat B-5: | | | | | | | | |
| Days Post-Inoc | 2 | 3 | 4 | 5 | 6 | 7 | 8 | |
| Temperature | 101.0 | 102.0 | 102.2 | 102.4 | 104.4 | 101.0 | 101.6 | |
| W.b.c | 11,950 | 9,050 | 7,250 | 7,100 | 1,300 | 6,850 | 6,850 | |
| Days Post-Inoc | 9 | 10 | 11 | 12 | 13 | 14 | 15 | |
| Temperature | 101.4 | 100.6 | 100 | 101.2 | 101.0 | 101.8 | 101.6 | |
| W.b.c | 10,200 | 10,850 | 15,900 | 22,250 | 33,800 | 30,900 | 3,450 | |
| Days Post-Inoc | 16 | | | | | | | |
| Temperature | 101.8 | (2) | | | | | | |
| W.b.c | 20,300 | | | | | | | |

(4th Passage Virus)

| Cat B-6: | | | | | | | |
|---|---|---|---|---|---|---|---|
| Days Post-Inoc | 2 | 3 | 4 | 5 | 6 | 7 | 8 |
| Temperature | 103.8 | 102.4 | 102.0 | 101.0 | 102.4 | 105.2 | 104.8 |
| W.b.c | 20,500 | 5,050 | 9,800 | 15,800 | 1,000 | 1,400 | 2,800 |
| Days Post-Inoc | 9 | 10 | 11 | 12 | | | |
| Temperature | 99.8 | 105.0 | 102.4 | (3) | | | |
| W.b.c | 9,700 | 24,000 | 13,450 | | | | |

(5th Passage Virus)

| Cat A-4: | | | | | | | |
|---|---|---|---|---|---|---|---|
| Days Post-Inoc | 1 | 2 | 3 | 4 | 5 | 6 | 7 |
| Temperature | 102.6 | 103.8 | 103.6 | 102.6 | 101.6 | 102.2 | 103.8 |
| W.b.c | 23,900 | 10,500 | 8,600 | 6,500 | 34,50 | 2,700 | 2,100 |
| Days Post-Inoc | 8 | 9 | 10 | | | | |
| Temperature | 104.0 | 102.4 | 101.0 | (2) | | | |
| W.b.c | 3,500 | 10,250 | 14,700 | | | | |
| Cat A-5: | | | | | | | |
| Days Post-Inoc | 1 | 2 | 3 | 4 | 5 | 6 | 7 |
| Temperature | 101.2 | 102.6 | 102.6 | 101.4 | 101.4 | 101.4 | 101.2 |
| W.b.c | 12,000 | 7,900 | 8,300 | 6,400 | 6,050 | 7,450 | 8,850 |
| Days Post-Inoc | 8 | | | | | | |
| Temperature | 101.4 | (2) | | | | | |
| W.b.c | 12,000 | | | | | | |

[1] Challenged. Temp. and count remained in normal range.
[2] Challenged. Remained normal.
[3] No temp. Posted.

It can be seen from Table 3 that the virus obtained from the first through fifth passage levels produced severe reactions in all domestic cats which had been inoculated with the same. It should also be noted that after the fifth passage it was possible to challenge cats A–4 and A–5 with virulent panleukopenia virus without causing death. From the w.b.c. of cats A–4 and A–5 it is apparent that the reaction in the cats was still somewhat severe.

Additional disease-free cats susceptible to panleukopenia were challenged with virus from the tenth passage level. The results are reported in Table 4:

TABLE 4
(10th Passage Virus from Cat A)

| | | | | | | | | | |
|---|---|---|---|---|---|---|---|---|---|
| Cat 375: | | | | | | | | | |
| Days Post-Inoc | 0 | 5 | 6 | 7 | 8 | 9 | 10 | 11 | 12 |
| Temperature | | 101.0 | 100.2 | 100.8 | 100.8 | 100.6 | 100.8 | 99.0 | 101.0 |
| W.b.c | 16,700 | 10,800 | 8,950 | 9,800 | 9,200 | 21,900 | 15,950 | 18,500 | 16,100 |
| Cat 376: | | | | | | | | | |
| Temperature | | 102.2 | 101.0 | 101.8 | 101.8 | 102.6 | 100.4 | 101.0 | 101.8 |
| W.b.c | 35,400 | 18,400 | 10,950 | 17,750 | 24,100 | 28,550 | 22,900 | 24,000 | 20,600 |
| Cat 377: | | | | | | | | | |
| Temperature | | 104.2 | 100.8 | 102.2 | 102.4 | 101.8 | 99.8 | 99.0 | 102.4 |
| W.b.c | 18,000 | 119,50 | 20,100 | 14,600 | 35,400 | 36,850 | 30,400 | 30,500 | 27,100 |
| Cat 378: | | | | | | | | | |
| Temperature | | 102.2 | 101.6 | 102.8 | 102.4 | 102.0 | 101.8 | 100.8 | 102.8 |
| W.b.c | 32,900 | 24,100 | 14,600 | 10,950 | 13,400 | 17,850 | 19,050 | 18,500 | 10,200 |
| Cat 379: | | | | | | | | | |
| Temperature | | 100.6 | 100.6 | 100.8 | 101.8 | 101.4 | 102.0 | 100.6 | 101.8 |
| W.b.c | 13,900 | 6,250 | 6,200 | 5,800 | 9,300 | 3,900 | 8,500 | 14,100 | 15,600 |
| Cat 380: | | | | | | | | | |
| Temperature | | | | 102.6 | 102.0 | 102.6 | 101.2 | 101.8 | 102.8 |
| W.b.c | 14,800 | | | 14,600 | 20,950 | 36,450 | 23,950 | 25,050 | 14,600 |
| Car 381: | | | | | | | | | |
| Temperature | | | | 102.8 | 102.2 | 102.4 | 101.4 | 101.2 | 102.0 |
| W.b.c | 19,600 | | | 20,100 | 22,950 | 23,100 | 28,150 | 26,250 | 25,250 |
| Cat 382: | | | | | | | | | |
| Temperature | | | | 102.0 | 101.6 | 102.2 | 101.0 | 101.0 | 102.0 |
| W.b.c | 12,450 | | | 11,950 | 13,250 | 28,050 | 21,900 | 20,550 | 19,550 |

From Table 4 above it is apparent that inoculation of the virus into domestic cats from the tenth passage level produced either no reaction or a relatively mild one. All of the cats reported in Table 4 were challenged with virulent panleukopenia virus without any indication of an adverse effect.

Litter-mates of the cats described in Table 4 were also challenged with virulent virus as control tests. The results of these tests are reported in Table 5 below:

TABLE 5.—CONTROL CATS
[Virus from infected cat spleen]

| | | | | | | | | | |
|---|---|---|---|---|---|---|---|---|---|
| Cat 359: | | | | | | | | | |
| Days Post-Inoc | 0 | 5 | 6 | 7 | 8 | 9 | 10 | 11 | 12 |
| Temperature | | 102.8 | 102.2 | 102.2 | 104.4 | Dead | | | |
| W.b.c | 11,400 | 5,750 | 6,450 | 7,500 | 450 | Posted | | | |
| Cat 360: | | | | | | | | | |
| Temperature | | 102.2 | 102.2 | 105.2 | 103.8 | Dead | | | |
| W.b.c | 21,650 | 16,600 | 20,450 | 17,150 | 3,850 | Posted | | | |
| Cat 361: | | | | | | | | | |
| Temperature | | 102.6 | 102.8 | 96.0 | Dead | | | | |
| W.b.c | 14,350 | 12,600 | 13,500 | 200 | Posted | | | | |
| Cat 362: | | | | | | | | | |
| Temperature | | 102.0 | 102.0 | 101.2 | 102.2 | 101.2 | 101.4 | 101.4 | [1] 101.8 |
| W.b.c | 10,200 | 12,750 | 9,000 | 6,700 | 3,750 | 8,100 | 4,500 | 7,350 | 6,800 |
| Cat 363: | | | | | | | | | |
| Temperature | | | | | 106.6 | 106.0 | 104.6 | 105.0 | Dead |
| W.b.c | 14,050 | | | | 850 | 700 | 2,850 | 7,250 | Posted |
| Cat 364: | | | | | | | | | |
| Temperature | | | | | 102.8 | 102.4 | Dead | | |
| W.b.c | 17,150 | | | | 23,550 | 1,150 | Posted | | |
| Cat 365: | | | | | | | | | |
| Temperature | | | | | 103.4 | 104.2 | 102.0 | 101.0 | 101.4 |
| W.b.c | 12,500 | | | | 15,150 | 18,200 | 20,550 | 15,500 | [1] 2,700 |
| Cat 366: | | | | | | | | | |
| Temperature | | | | | 102.0 | 105.0 | 106.0 | 101.0 | 101.4 |
| W.b.c | 13,050 | | | | 3,050 | 900 | 3,300 | 6,300 | [1] 10,350 |

[1] Survived.

It can be seen from Table 5 that half of the cats challenged with virulent panleukopenia virus died; however, all of them showed severe reactions of the typical panleukopenia disease.

Although the foregoing examples employed kidney tissue, similar results are obtained by employing intestinal, tonsil, testicle, lung, liver, spleen, cardial, and the like tissue, as well as similar tissue from coon and grey fox.

We claim:

1. A method of serially propagating panleukopenia virus in tissue culture medium which comprises, in the first passage, combining, in a form suitable for tissue culturing, disease-free domestic cat tissue, pre-infected with virulent panleukopenia virus of domestic cats by administering panleukopenia virus into disease-free domestic cats which are seronegative to panleukopenia, derived by aseptic removal of said tissue from such cats, sacrificed after they exhibit clinical and pathological signs of the disease, with a growth medium suitable for growth of said tissue, and at least six subsequent passages of the harvested virus from the first passage through tissue cultures of cat tissue from disease-free domestic cats.

2. The method of claim 1 wherein the virus is serially passed between about ten and thirty times in cat kidney tissue culture.

3. A method which comprises combining trypsinized, disease-free, domestic cat kidney, pre-infected with virulent panleukopenia virus of domestic cats by injecting panleukopenia virus into disease-free domestic cats which are seronegative to panleukopenia, derived by aseptic removal of said tissue from such cats, sacrificed after they exhibit severe clinical and pathological signs of the disease, with a growth medium, suitable for growth of said tissue, containing an animal serum, and replacing the growth medium until the kidney cells show significant degeneration, harvesting the fluid of the aforesaid tissue culture containing panleukopenia virus, serially passing the harvested fluid through subsequent tissue cultures of domestic cat kidney tissue, free of panleukopenia virus and other disease, and growth medium, including animal serum, for at least an additional six times, and stopping each passage when the kidney cells show significant degeneration.

4. The method of claim 3 wherein the animal serum is calf serum.

5. The method of claim 1 wherein the harvested virus is subjected to between about 10 to about 30 subsequent passages in cat tissue culture from disease free domestic cats.

6. The live attenuated panleukopenia virus vaccine prepared in accordance with claim 1.

7. The method of protecting susceptible cats of the family Felidae from panleukopenia which comprises administering to said cat an effective dose of the live attenuated panleukopenia virus vaccine prepared in accordance with claim 1.

8. The method of protecting susceptible mink from enteritis which comprises administering to said mink an effective dose of the live attenuated panleukopenia virus vaccine prepared in accordance with claim 1.

9. A process for preparing a live attenuated panleukopenia vaccine which comprises:
 (a) infecting a healthy panleukopenia-susceptible animal of the family Felidae with virulent panleukopenia virus;
 (b) sacrificing said infected animal after it exhibits pathological symptoms of panleukopenia disease;
 (c) removing tissue containing said panleukopenia virus from said sacrificed animal and preparing a tissue culture therefrom;
 (d) culturing said tissue culture;
 (e) harvesting the liquid of said culture containing panleukopenia virus;
 (f) subsequently causing said liquid to be serially passaged at least 6 times and less than about 250 times in tissue cultures prepared from tissue free from panleukopenia virus; and
 (g) recovering the live attenuated panleukopenia virus produced thereby.

10. The process of claim 9, wherein in step (f) the tissue culture is prepared from panleukopenia virus-free tissue of an animal of the family Felidae.

11. The process of claim 9, wherein step (c) the tissue is kidney tissue.

12. The process of claim 9, wherein in step (f) the tissue culture is prepared from panleukopenia virus-free tissue of domestic cats.

13. The process of claim 9, wherein in step (f) the tissue culture is prepared from panleukopenia virus-free kidney tissue of domestic cats.

14. The process of claim 9, wherein in step (d) the tissue culturing is for a period of from about ten to twenty days.

15. The process of claim 9, wherein in step (f) the liquid is subsequently serially passaged from about ten to about thirty times.

16. The live attenuated panleukopenia virus vaccine obtained in accordance with claim 9.

17. The method of protecting a susceptible animal of the family Felidae from panleukopenia which comprises administering to said animal an effective dose of the vaccine prepared in accordance with claim 9.

18. The method of protecting susceptible minks from mink enteritis which comprises administering to said mink an effective dose of the vaccine prepared in accordance with claim 9.

References Cited by the Examiner

Ackermann, O., "Die Katzenseuche-infektiose Enteritis oder Panleukopenie der Katze und ihre Bekampfung durch aktive Immunisierung." Blauen HF. den Tierzarzt. 4:215–219, 1959.

Adams, I. W. et al., "Therapeutic Experiences—Question: What Is Your Method of Treatment of Enteritis in the Cat?" Mod. Vet. Pract. 40 (8):49–54, Apr. 15, 1959.

Bolin, V. S., "The Cultivation of Panleucopenia Virus in Tissue Culture," Virology 4 (2):389–390, October 1957.

Brion, A., et al., "Attenuation du virus de la leucopenie infectieuse des chats." Soc. de Biol. Compt. Rend 142, pp. 333–334, March 1948.

Englert, H. K., "Laryngo-enteritis infectiosa der katzen und ihre bekampfung mittels formol-vaccine," Tierarztl. Umschau 8: 282–284, August 1953.

Johnston, R. V., "Feline Distemper Vaccine," Allied Vet. 29(1), pp. 12–13, January/February 1958.

Lannek, N., "Feline Distemper, Treatment, and Prevention" (in Swedish), Sveriges Vetforbund. Medlemsbl. 10 (23/24): 417–418, December 1958.

LEWIS GOTTS, *Primary Examiner.*

S. K. ROSE, *Assistant Examiner.*